United States Patent [19]
Lewis et al.

[11] Patent Number: 5,873,250
[45] Date of Patent: Feb. 23, 1999

[54] NON-POLLUTING OPEN BRAYTON CYCLE AUTOMOTIVE POWER UNIT

[75] Inventors: Ralph H. Lewis, 117 Mt. Etna Dr., Clayton, Calif. 94517; David Gordon Wilson, Winchester, Mass.

[73] Assignee: Ralph H. Lewis, Clayton, Calif.

[21] Appl. No.: 864,650

[22] Filed: May 28, 1997

Related U.S. Application Data

[63] Continuation of Ser. No. 497,622, Jun. 30, 1995, Pat. No. 5,634,339.

[51] Int. Cl.[6] .................................................. F02C 1/04
[52] U.S. Cl. .................................. 60/650; 60/659; 60/682
[58] Field of Search ........................... 60/650, 659, 682; 165/10, 104.17

[56] References Cited

U.S. PATENT DOCUMENTS

| | | | |
|---|---|---|---|
| 3,894,605 | 7/1975 | Salvadorini | 180/65 R |
| 4,089,176 | 5/1978 | Ashe | 60/650 |
| 4,215,553 | 8/1980 | Poirier et al. | 60/650 |
| 4,258,677 | 3/1981 | Sanders | 123/142.5 |
| 4,259,836 | 4/1981 | Finckh | 60/676 |
| 4,262,484 | 4/1981 | Jubb et al. | 60/659 |
| 4,463,799 | 8/1984 | Takahashi et al. | 165/10 |
| 4,768,345 | 9/1988 | Kardas | 60/659 |
| 5,207,268 | 5/1993 | Kraus et al. | 165/104.11 |
| 5,259,444 | 11/1993 | Wilson | 165/8 |
| 5,385,214 | 1/1995 | Spurgeon | 180/304 |

OTHER PUBLICATIONS

Percival and Tsou; "Power from Thermal Energy Storage Systems;" Oct. 1929—Nov. 1 '62, pp. 2–33 & Figures 1—16; from the Combined National Fuels and Lubricants, Powerplant and Transportation Meeting; Society of Automotive Engineers, Inc.

Garrett Fluid Systems Division, Allied–Signal Aerospace Company, "Space Power for the New Frontier;" Date Unknown, pp. 19–23, 30–34, 36–37 and 41–42.
DeVries, Karig & Drage; "Eutectic Molten Salt Thermal Storage System;" Oct. 1969 pp. 191–195 of *J. Hydronautics*, vol. 3, No. 4.
Meijer, "Prospects of the Stirling Engine for Vehicular Propulsion;" copyright 1970, pp. 169–185; from the Phillips Technical Review, vol. 31, No. 5/6.
Kettler; "The Thermal Vehicle—A Pollution Free Concept;" Aug. 18–22, 1975 from the Record of the Tenth Intersociety Energy Conversion Engineering Conference.

*Primary Examiner*—Noah P. Kamen
*Attorney, Agent, or Firm*—Donald E. Schreiber

[57] ABSTRACT

The present invention includes a open-Brayton-cycle automotive power-generation unit adapted to be energized by stored thermal energy. Thermal energy, absorbed from hot thermal-energy-storage material present in a working fluid heating vessel, heats a working fluid that passes through the unit's turbine. The unit also includes a rotary impeller that draws the flow of working-fluid into the unit from the surrounding atmosphere and discharges it into a working-fluid heat regenerator. Within the regenerator, working fluid from the compressor is warmed by thermal energy from hot working-fluid exhausted from the turbine. After passing through the regenerator, working-fluid from the turbine is discharged into the atmosphere. Working-fluid from the compressor flows from the regenerator through the heating vessel into the turbine. An alternator converts energy from the turbine into electricity. The electric energy thus obtained powers a vehicle's electric drive motors. Sealed ceramic tubes, filled with a material having a melting temperature within the operating temperature range of the thermal-energy-storage material, provide thermal energy storage. Regeneration of stored thermal energy may be achieved in various ways including both a combustible-fuel burner and an electrical heater, that are both located within the heating vessel, and by an automated regeneration station.

21 Claims, 3 Drawing Sheets

NON-POLLUTING OPEN BRAYTON CYCLE AUTOMOTIVE POWER UNIT

This is a continuation of application Ser. No. 08/497,622 filed Jun. 30, 1995, which issued Jun. 3, 1997, as U.S. Pat. No. 5,634,339.

BACKGROUND OF THE INVENTION

1. Field of the Invention

The present invention relates generally to the technical field of motive power systems for automotive vehicles, and, more particularly, to automotive-vehicle motive power systems that convert stored thermal energy into electricity for energizing electric-vehicle driving motors.

2. Description of the Prior Art

Present and anticipated air-pollution regulations indicate that emission-free vehicles will be operating in major urban areas in the foreseeable future. Presently, electricity appears to be the only possible energy source to power an emission-free vehicle. A significant difficulty with presently proposed electric vehicles is that they employ batteries which currently have an unsatisfactorily low energy density. The energy density of presently available batteries is so low that a battery-powered vehicle intended to travel 400 miles between battery recharging can carry nothing other than the batteries which power the vehicle's operation. Consequently, producing a useful battery-powered vehicle with a 400-mile cruising range requires a major breakthrough in battery technology.

For scores of years in various industrial settings steam-powered locomotives have operated which lack any ability for heating water to make steam. Rather, such locomotives are powered by stored thermal energy. The power source carried by these locomotives is a heavily insulated water tank which is periodically filled with superheated water. This superheated water provides the locomotive's power source. The energy density of such superheated water is so great that it has an energy density comparable to that of present electrical batteries.

Employing hot water as a thermal-energy-storage material, U.S. Pat. No. 5,385,214 which issued Jan. 31, 1995 on an application filed by John E. Spurgeon ("the Spurgeon patent"), discloses a motor vehicle having a "heat battery" which supplies high-pressure steam to a conventional heat engine that includes a steam turbine. The Spurgeon patent expressly discloses that the heat battery stores hot water at a temperature of 374 degrees centigrade ("°C."), i.e. 705 degrees Fahrenheit ("°F."), and at a pressure of 221 bar, i.e. 3205 pounds per square inch ("PSI"). The Spurgeon patent employs hot water at this particular temperature and pressure because under those conditions the material's heat capacity appears to be infinite.

A technical paper entitled "The Thermal Vehicle—A Pollution Free Concept" by Jack R. Kettler presented at the "Tenth Intersociety Energy Conversion Engineering Conference held Aug. 18–22, 1975 ("the Kettler paper"), compares thermal and electric vehicles, emphasizing system design performance. The Kettler paper also compares alternative types of heat engines and thermal-storage materials. The Kettler paper reports that most automotive gas-turbine-engine studies have dealt with internal-combustion gas turbines. It comments that these studies are not pertinent to the thermal vehicle since they used a 1900° F. turbine inlet temperature, which would be too high for a gas turbine if its working fluid were to be heated by an external source. The Kettler paper further reports that a closed-cycle gas turbine operating with external combustion had been designed with a turbine inlet temperature of 1500° F.

The Garrett Fluid Systems Division of Allied-Signal Aerospace Company has, over many years, developed various closed-Brayton-cycle power systems which have used a quantity of argon gas, continuously circulating in a closed loop, as a working fluid. Various heat sources including an electrical heat source, a diesel-fueled heat source, and a $CO_{60}$ heat source have been used with these closed-Brayton-cycle power systems.

A technical paper entitled "Power From Thermal Energy Storage Systems" by Worth H. Percival and Michael Tsou presented at the Society of Automotive Engineers Combined National Fuels and Lubricants, Powerplant and Transportation Meetings, October 29 through Nov. 1, 1962, (the Percival paper"), reports various proposals that have been made for using stored thermal energy. For example the Percival paper reports a proposal for electrically heating crushed stone during off-load hours, and then subsequently using the stored heat for space heating when electrical power system load is high. The Percival paper also reports that heat stored in refractory pebbles or spheres at temperatures as high as 3000° F. has been used for brief intervals in heating air or other gases to a high temperature in high-speed wind tunnels. In considering various alternatives for converting stored heat into mechanical energy, the Percival paper states that, in comparison with the Stirling engine's efficiency of approximately 40%, it is questionable whether a Brayton-cycle gas turbine will ever reach an efficiency of 40%. The Percival paper states unequivocally that the Brayton-cycle gas turbine "can not hope to compete on the basis of total integrated work available from [a thermal energy] storage tank compared to the Rankine cycle steam cycle or Stirling engine." The Percival paper also states that in converting stored thermal energy into mechanical energy, a closed-Brayton-cycle turbine achieves higher efficiency than an open-Brayton-cycle turbine.

SUMMARY OF THE INVENTION

An object of the present invention is to provide a pollution-free automotive vehicle capable of carrying a practical load for a commercially practical distance.

Another object of the present invention is to provide a pollution-free automotive vehicle having performance comparable to present vehicles powered by internal-combustion engines.

Another object of the present invention is to provide a pollution-free automotive vehicle having performance comparable to present vehicles without requiring development of a new energy technology.

Another object of the present invention is to provide a pollution-free automotive vehicle which employs existing energy sources more efficiently.

Another object of the present invention is to provide a pollution-free automotive vehicle which can be assembled using existing technologies.

Another object of the present invention is to provide a pollution-free automotive vehicle which can be refueled quickly.

Yet another object of the present invention is to provide a pollution-free automotive vehicle whose construction requires only plentiful and readily available materials.

Yet another object of the present invention is to provide a lighter pollution-free automotive vehicle.

Yet another object of the present invention is to provide a pollution-free automotive vehicle powered by stored thermal energy that does not require a condenser.

Yet another object of the present invention is to provide a simpler pollution-free automotive vehicle powered by stored thermal energy.

Yet another object of the present invention is to provide a more cost-effective pollution-free automotive vehicle powered by stored thermal energy.

Briefly, the present invention includes a non-polluting, open-Brayton-cycle automotive power-generation unit. The automotive power-generation unit is specifically adapted to be energized by thermal energy stored in a working-fluid heating vessel that contains a quantity of hot thermal-energy-storage material. To energize the automotive power-generation unit, a flow of comparatively cool gaseous working-fluid enters the working-fluid heating vessel, is heated by absorption of thermal energy from the hot thermal-energy-storage material, and then flows out of the working-fluid heating vessel into an inlet of the power-generation unit's turbine.

To supply the flow of cooler working-fluid to the working-fluid heating vessel, the automotive power-generation unit includes a compressor. The power-generation unit's compressor includes a impeller that is secured to a power-generation-unit drive shaft which is also secured to a turbine wheel of the turbine. The power-generation unit supports the drive shaft so it is rotatable together with the impeller and turbine wheel about the drive shaft's longitudinal axis. The flow of hot working-fluid past the turbine's wheel energizes the drive shaft's rotation. Rotation of the power-generation unit's compressor draws the flow of working-fluid from the surrounding atmosphere through a compressor inlet into the automotive power-generation unit. The power-generation unit's compressor discharges the flow of working-fluid into a working-fluid heat regenerator.

Working-fluid from the power-generation unit's compressor flowing through the working-fluid heat regenerator is warmed by thermal energy transferred to such working-fluid from hot working-fluid discharged into the heat regenerator from the power-generation unit's turbine. After the working-fluid exhausted from the turbine passes through the heat regenerator, it is discharged into the atmosphere surrounding the automotive power-generation unit. The working-fluid from the power-generation unit's compressor, after being warmed within the heat regenerator, flows into the working-fluid heating vessel.

The automotive power-generation unit preferably includes an alternator coupled to the power-generation unit's drive shaft which converts the drive shaft's rotational energy into electric energy. The electric energy thus obtained powers a motor vehicle's electric drive motors.

The thermal-energy-storage material preferably includes sealed tubes of a ceramic material that are filled with a material which melts at a temperature that is within the operating temperature range of the thermal-energy-storage material. Employing a material that undergoes a phase change from the liquid phase to the solid phase within the thermal-energy-storage material's operating temperature range significantly increases the amount of thermal energy which the working-fluid heating vessel may store.

The present invention also includes various different ways for regenerating the thermal energy stored in the thermal-energy-storage material including both a combustible-fuel burner located within the working-fluid heating vessel, and an electrical heater energized by electricity produced by energy-recovering regenerative braking of the motor vehicle. Moreover, the present invention also includes an automated regeneration station adapted for quickly regenerating cool thermal-energy-storage material.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 1:
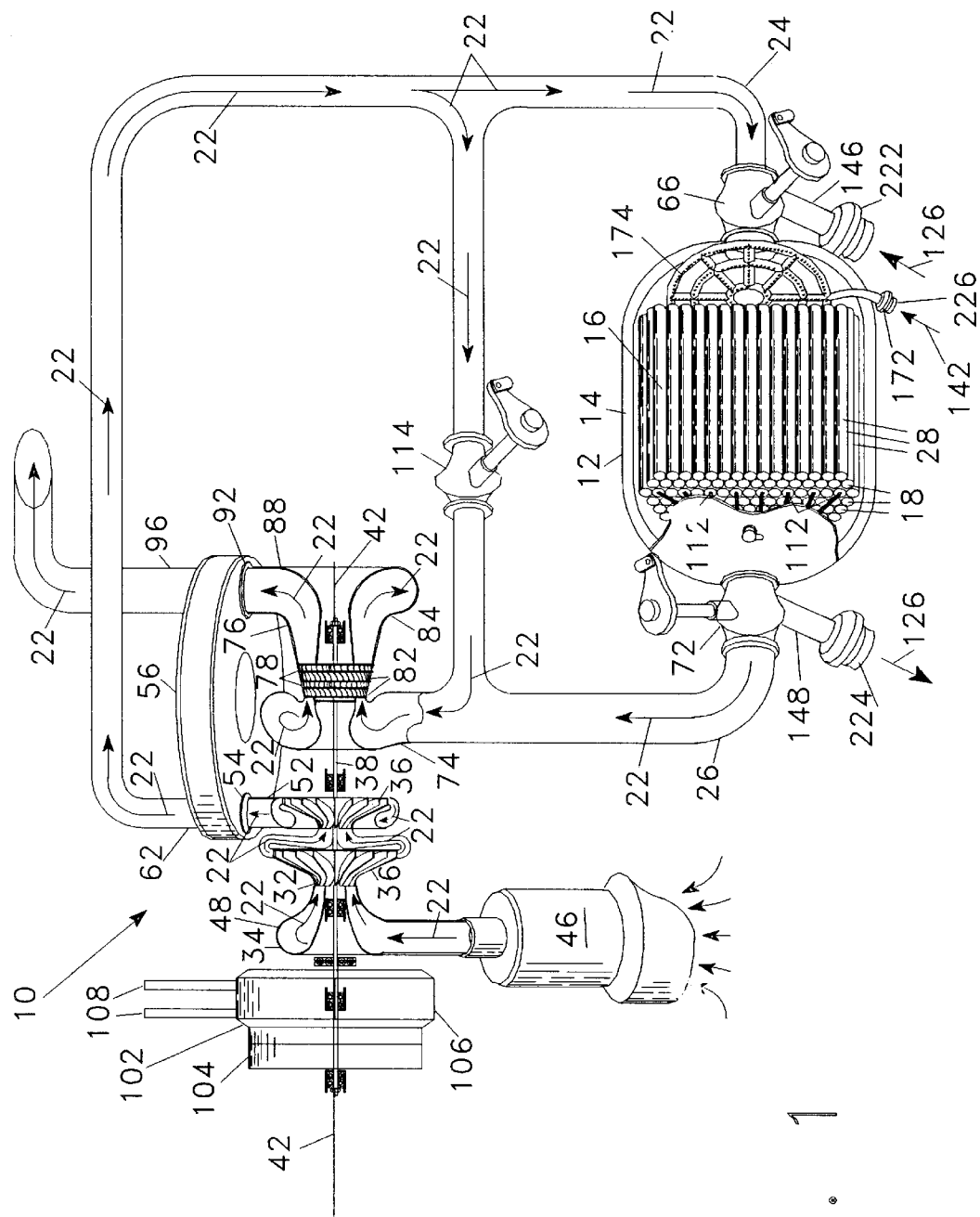
FIG. 1 is a cross-sectional plan view of an open-Brayton-cycle automotive power-generation unit in accordance with the present invention together with its associated working-fluid heating vessel that contains a quantity of thermal-energy-storage material.

FIG. 1 is a cross-sectional plan view depicting a non-polluting, open-Brayton-cycle automotive power-generation unit in accordance with the present invention, referred to by the general reference character 10. As illustrated in FIG. 1, the automotive power-generation unit ("APGU") 10 is coupled to a working-fluid heating vessel ("WFHV") 12. The WFHV 12 includes an insulated outer housing 14 which encloses a quantity of hot thermal-energy-storage material ("TESM") 16. The TESM 16 is preferably a ceramic material which may be selected from among materials such as silicon, boron carbide, alumina, aluminum carbide, or beryllium oxide. A working fluid 22, as indicated by the various arrows in FIG. 1, flows from a working-fluid heating vessel inlet ("WFHVI") 24 of the WFHV 12, through the WFHV 12, and out of a working-fluid heating vessel outlet ("WFHVO") 26. The working fluid 22 flowing through the WFHV 12 is heated by absorbing thermal energy from the hot TESM 16 present within the WFHV 12.

The ceramic TESM 16 is arranged to provide a porous structure having a plurality of passages 18 through which the working fluid 22 flows. A presently preferred form for the TESM 16, illustrated in FIG. 1, is that of sealed, beryllium-oxide tubes 28 which remain solid at a temperature in excess of 2800° F. Such ceramic tubes 28 are filled with silicon, or some other suitable material, which melts at a temperature between 2000° and 2800° F. As is readily apparent to those knowledgeable about energy release or absorption occurring during a material's phase change between a solid and a liquid, solidification of an appropriately selected material releases a significant amount of thermal energy. Accordingly, storing thermal energy in a appropriately selected TESM 16 which melts at a temperature which is in the operating temperature range of the TESM 16 significantly increases the amount of energy which the WFHV 12 may store for release to the working fluid 22.

To supply a flow of working fluid 22 to the WFHVI 24 of the WFHV 12, the APGU 10 includes a two-stage centrifugal compressor 32. The compressor 32 includes an outer housing 34 that encloses two compressor disks 36 which are respectively secured to a drive shaft 38 having a longitudinal axis 42. Rotation of the compressor disks 36 together with the drive shaft 38 about the longitudinal axis 42 draws a flow of working fluid 22 from atmosphere surrounding the APGU 10, through a cyclonic air filter 46, and into the compressor 32 through a compressor inlet 48. The working fluid 22 being admitted into the compressor 32 through the air filter 46 generally carries particulates which the air filter 46 traps and retains to prevent damage to the APGU 10. The compressor 32 discharges the flow of working fluid 22 drawn from the atmosphere surrounding the APGU 10 from a compressor outlet 52.

For a APGU 10 intended to generate approximately 190 horsepower ("HP") that is adapted for powering a motor vehicle, the compressor 32 preferably includes two (2) centrifugal compressor disks 36 that are each respectively approximately 8.0 inches in diameter and are preferably injection molded from a carbon-fiber-reinforced material. The two-stage compressor 32 included in such a APGU 10 preferably provides a pressure ratio of two when the compressor disks 36 rotate at 17,000 revolutions per minute ("RPM"). While the preferred embodiment of the present invention envisions a two-stage centrifugal compressor 32, a APGU 10 in accordance with the present invention may alternatively be constructed using from one to four or more centrifugal stages, or, for larger power outputs, an axial-centrifugal or an axial-flow compressor, or any other suitable type of compressor, instead of the preferred centrifugal compressor 32. Accordingly, a APGU 10 in accordance with the present invention may be assembled using any of the different types of impellers identified above for drawing the flow of working fluid 22 into said compressor 32 through the compressor inlet 48 and discharging the flow of working fluid 22 from the compressor outlet 52.

The working fluid 22 discharged from the compressor outlet 52 of the compressor 32 enters a compressor inlet 54 of a heat regenerator 56 that is coupled to a working-fluid heat-regenerator outlet 62. Disposed between the working-fluid heat-regenerator outlet 62 of the heat regenerator 56 and the WFHVI 24 of the WFHV 12, the APGU 10 of the present invention preferably includes a first thermal-regeneration control valve ("FTRCV") 66. Oriented in the position illustrated in FIG. 1, the FTRCV 66 permits working fluid 22 to flow unimpeded from the working-fluid heat-regenerator outlet 62 into the WFHVI 24.

The WFHVO 26 of the WFHV 12 is coupled, through a second thermal-regeneration control valve ("STRCV") 72, to an inlet 74 of a turbine 76. Oriented in the position illustrated in FIG. 1, the STRCV 72 permits hot working fluid 22 to flow unimpeded from the WFHVO 26 into the inlet 74. The turbine 76 includes a pair of axial-flow turbine wheels 78 that are secured to the drive shaft 38 to be rotatable about the longitudinal axis 42 thereof. Each of the turbine wheels 78 is respectively preceded by a row of stator blades 82 which project inward toward the drive shaft 38 from an outer housing 84 of the turbine 76. The turbine 76 also includes a turbine exhaust 88 through which the flow of working fluid 22 discharges from the turbine 76. The flow of hot working fluid 22 from the WFHV 12 which passes through the turbine 76 induces rotation both of the turbine wheels 78 and of the drive shaft 38 to which they are secured. As described previously, such rotation of the drive shaft 38 also causes the compressor disks 36 to draw a flow of working fluid 22 from atmosphere surrounding the APGU 10 into the compressor 32.

For a APGU 10 intended to generate approximately 109 HP that is adapted for powering a motor vehicle, the turbine 76 preferably includes two (2) axial-flow turbine wheels 78 that are each respectively 7.00 to 8.00 inches in diameter and are preferably fabricated from a suitable ceramic material.

The two-stage turbine 76 included in such a APGU 10 preferably provides an expansion ratio under two when the turbine wheels 78 rotate at 17,000 RPM. While the preferred embodiment of the present invention envisions an axial-flow turbine 76, a APGU 10 in accordance with the present invention may alternatively be constructed using a centrifugal flow turbine wheel, or any other suitable type of turbine wheel, instead of the preferred axial-flow turbine 76.

The heat regenerator 56 also includes a turbine exhaust inlet 92 that is coupled to the turbine exhaust 88 of the turbine 76, and which receives the flow of working fluid 22 exhausted from the turbine 76. Within the heat regenerator 56, the turbine exhaust inlet 92 is coupled to a heat-regenerator outlet 96. Accordingly, working fluid 22 exhausted from the turbine 76 enters the heat regenerator 56 through the turbine exhaust inlet 92 and is discharged from the heat-regenerator outlet 96 of the heat regenerator 56 into the atmosphere surrounding the APGU 10. Within the heat regenerator 56 during operation of the APGU 10, thermal energy flows from hotter working fluid 22 received from the turbine 76 to cooler working fluid 22 received from the compressor 32. This flow of thermal energy cools the working fluid 22 received from the turbine 76 while concurrently heating the working fluid 22 received from the compressor 32.

The heat regenerator 56 is preferably of a type disclosed in U.S. Pat. No. 5,259,444 entitled "Heat Exchanger Containing a Component Capable of Discontinuous Movement" that issued Nov. 9, 1993, on an application filed by David G. Wilson ("the '444 Patent"). The '444 Patent is hereby incorporated herein by reference.

While for powering the motion of a motor vehicle it is possible to couple the drive shaft 38 mechanically to the motor vehicle's wheels, for reasons described in greater detail below the preferred embodiment of the APGU 10 includes alternator 102 which preferably is of an axial gap construction. The alternator 102 includes a rotor 104 that is coupled to the drive shaft 38 for rotation about the longitudinal axis 42. The alternator 102 also includes a stator 106 that is fixed with respect to the APGU 10. Upon rotation of the rotor 104 by the drive shaft 38, a pair of power output terminals 108, included in the alternator 102, supply an electric current to an electrical load that is external to the APGU 10. In a motor vehicle, such an external electrical load preferably includes one or more electric motors for driving the motor vehicle's wheels in a manner such as that described in U.S. patent application Ser. No. 08/306,159 entitled "Terrestrial Vehicle Motive Power Systems" that was filed Sep. 14, 1994, by Ralph H. Lewis ("the '159 Patent Application"). The '159 Patent Application is hereby incorporated herein by reference.

During normal operation of the APGU 10, working fluid 22 flows out of the compressor 32 and into the heat regenerator 56 at a temperature of approximately 400° F. and a pressure of approximately 2 bars. Passage of the working fluid 22 through the heat regenerator 56 further heats the working fluid 22 to a temperature of approximately 1535° F. The working fluid 22 is then further heated to a temperature of approximately 1850° F. upon passing through the WFHV 12 to enter the turbine 76 at that temperature and at a pressure of approximately 1.8 bars. Upon being exhausted from the turbine 76, the working fluid 22 is at a pressure of approximately 1.02 bars and at a temperature of 1570° F. Passage of the working fluid 22 through the heat regenerator 56 further cools the working fluid 22 to a temperature of approximately 262° F.

Operating in the preceding manner, the APGU 10 described herein together with the WFHV 12 weighs approximately 700 pounds and produces approximately 190 HP. Furthermore, operating in this manner the APGU 10 converts thermal energy stored in the TESM 16 of the WFHV 12 into electrical energy available at the power output terminals 108 of the alternator 102 at an efficiency of approximately 48 to 50%. When incorporated into a motor vehicle that employs axial gap electric motors for driving the motor vehicle's wheels, thermal energy present in the TESM 16 of the WFHV 12 is converted into driving energy for the vehicle with an overall efficiency of approximately 40 to 45%. Consequently, a WFHV 12 containing 600 pounds of the TESM 16 stores sufficient thermal energy to power a 4000 pound motor vehicle 300 miles without stopping to refuel at an average speed of 60 to 65 miles per hour.

As described above, the WFHV 12 includes a quantity of TESM 16 which, when the APGU 10 initially begins operating, is preferably heated to a temperature of approximately 2,800° F. During operation of the APGU 10, the flow of thermal energy from the TESM 16 within the WFHV 12 to the working fluid 22 flowing through the WFHV 12 cools the TESM 16 to a temperature of approximately 1,500° F. before the power produced by the APGU 10 becomes insufficient for powering a motor vehicle. Consequently, the TESM 16 included in the WFHV 12 must be periodically reheated just as a conventional internal-combustion engine motor vehicle must be periodically refueled.

The preferred embodiment of the present invention provides several alternative, and mutually compatible ways for reheating the TESM 16. For example, as disclosed in the '159 Patent Application, one way to partially reheat the TESM 16 is to employ regenerative braking of a motor vehicle which incorporates the APGU 10. To permit reheating the TESM 16 using electrical energy generated by regenerative braking, the WFHV 12 includes electrical resistive elements 112 by which electrical energy generated by regenerative braking electrically heats the TESM 16. Moreover, whenever a motor vehicle incorporating the APGU 10 operates so that regenerative braking supplies electrical energy to the TESM 16, an automatically controlled bypass valve 114 opens to divert around the WFHV 12 the working fluid 22 flowing from the heat regenerator 56 to the turbine 76. Because the bypass valve 114 provides an alternative path by which the working fluid 22 may flow from the working-fluid heat-regenerator outlet 62 of the heat regenerator 56 to the inlet 74 of the turbine 76, during normal operation of the APGU 10 in a motor vehicle, the bypass valve 114 opens and closes in response to the power load placed on the APGU 10 so the working fluid 22 flows into the turbine 76 at a constant temperature.

In addition to using electrical energy generated by regenerative braking for reheating the TESM 16 included in the WFHV 12, as described in the '159 Patent Application if the motor vehicle employing the APGU 10 is stationary, the TESM 16 may be reheated by supplying to the electrical resistive elements 112 electrical energy provided by a source of electrical energy that is external to the motor vehicle, e.g. an electric power utility.

While reheating of the TESM 16 using electrical energy is easy, safe, and convenient, in general it is not the least expensive way of recharging the energy stored within the WFHV 12. Generally, it is cheaper and more energy efficient to regenerate the TESM 16 by passing through the WFHV 12 a flow of a gas heated directly by burning a combustible fuel. Moreover, depending upon the type of fuel burned and the manner in which it is burned, it is possible to regenerate the TESM 16 without air pollution.

Figure 2:
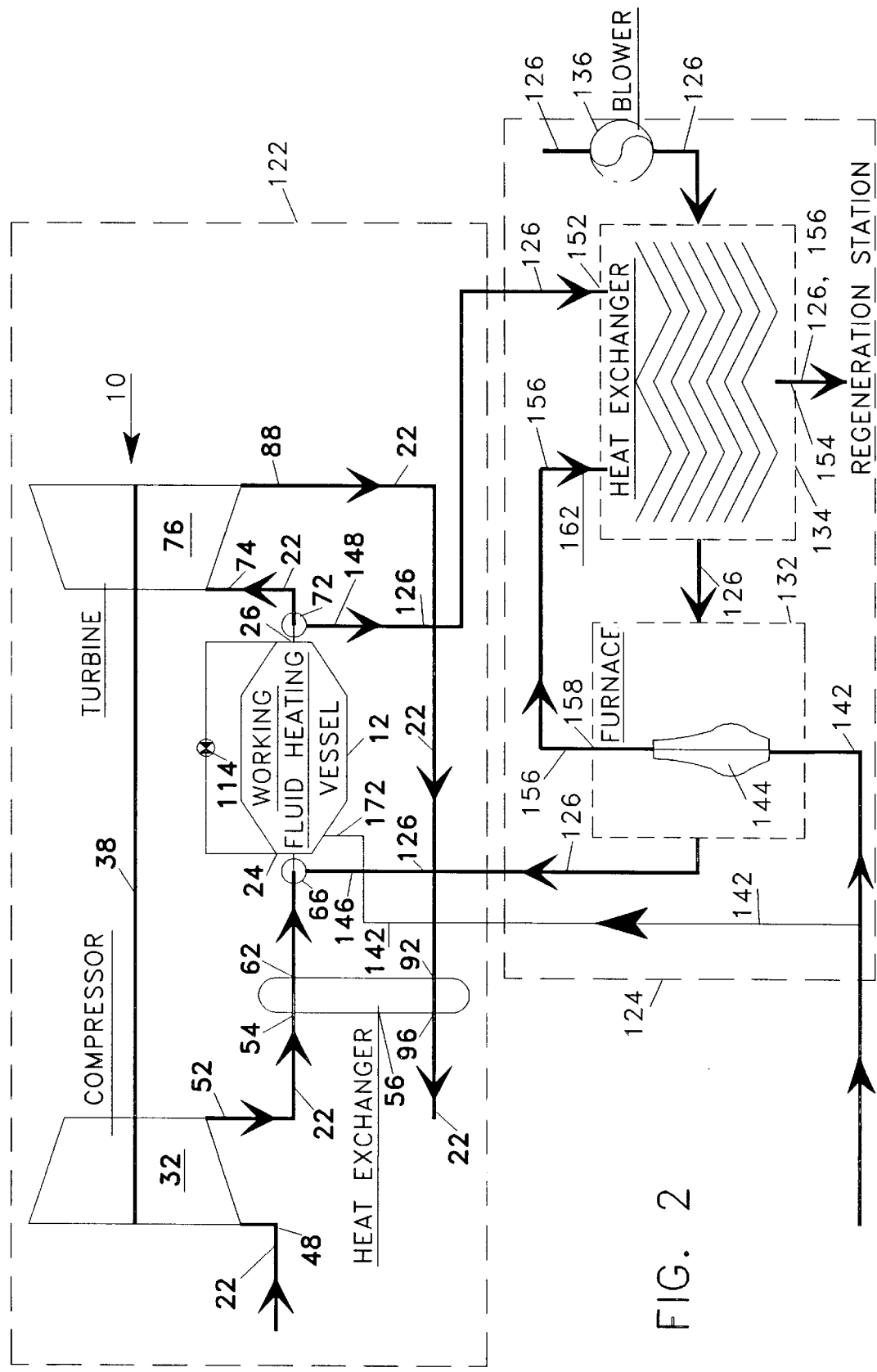
FIG. 2 is a block diagram depicting fluid-flow circuits for the automotive power-generation unit and the working-fluid heating vessel together with a preferred thermal-regeneration station.

The block diagram of FIG. 2 illustrates within a dashed line 122 fluid-flow circuits for the APGU 10 and the WFHV 12 as adapted for inclusion in a motor vehicle. In addition, FIG. 2 illustrates a preferred thermal regeneration station 124, enclosed within a dashed line, that is adapted for quickly regenerating the thermal energy stored in the TESM 16 using a flow of a hot regenerating gas 126. The regeneration station 124 basically consists of a specially adapted furnace 132 and heat regenerator 134.

The flow of regenerating gas 126 is initially drawn into the regeneration station 124 from atmosphere surrounding the regeneration station 124 by a blower 136. The blower 136 forces the regenerating gas 126 through the heat regenerator 134 in which the regenerating gas 126 is partially heated in a manner to be described hereinbelow. The regenerating gas 126 then flows through the furnace 132 wherein the regenerating gas 126 is further heated. To heat the regenerating gas 126 within the furnace 132, the furnace 132 receives a flow of a combustible fuel 142, preferably natural gas, which burns within a fire box 144 located within the furnace 132. Upon leaving the furnace 132 after flowing past the fire box 144, the regenerating gas 126 is preferably heated to a temperature of approximately 2800° F.

The hot regenerating gas 126 from the furnace 132 then flows into a regeneration gas inlet 146 of the FTRCV 66 which, during regeneration of the TESM 16, is oriented so as to provide an unimpeded flow for the regenerating gas 126 into the WFHV 12. After flowing through the WFHV 12, the regenerating gas 126 is directed by the STRCV 72 through a regeneration gas outlet 148 back to a regeneration gas inlet 152 of the heat regenerator 134.

The still hot regenerating gas 126, in flowing from the regeneration gas inlet 152 through the heat regenerator 134 to a heat-regenerator exhaust 154, partially heats regenerating gas 126 entering the heat regenerator 134 from the blower 136. Within the heat regenerator 134, the regenerating gas 126 coming from the blower 136 is further heated by a flow of hot combustion gas 156 flowing out of an exhaust 158 of the furnace 132 and into a combustion gas inlet 162 to the heat regenerator 134. Similar to the regenerating gas 126 flowing through the heat regenerator 134, the hot combustion gas 156 in flowing from the combustion gas inlet 162 through the heat regenerator 134 to the heat-regenerator exhaust 154 further heats regenerating gas 126 passing through the heat regenerator 134.

In addition to supplying hot regenerating gas 126 to the WFHV 12, the regeneration station 124 in accordance with the present invention also supplies a flow of combustible fuel 142 to the WFHV 12. As illustrated in FIG. 1, the WFHV 12 also includes a combustible-fuel inlet port 172 through which a flow of combustible fuel 142, preferably natural gas, is introduced into the WFHV 12. Moreover, disposed within the WFHV 12 are burners 174 in which the combustible fuel 142 mixes with the regenerating gas 126 to burn in intimate contact with the TESM 16 so the thermal energy of such burning couples directly to the TESM 16.

Operating in the preceding manner, the hot gas method for regenerating the thermal energy stored in the TESM 16 operates at an overall efficiency of approximately 98%. This efficiency for regeneration of the thermal energy stored in the TESM 16 combined with the efficiency for conversion of thermal energy stored in the TESM 16 into electrical energy by the APGU 10 results in an overall efficiency of approximately 45 to 50%. Correspondingly, a motor vehicle incorporating the APGU 10 disclosed herein operates an overall efficiency of 35 to 40% in converting energy in the combustible fuel 142 into driving energy for the vehicle's wheels. This energy efficiency for a motor vehicle powered by the APGU 10 compares most favorably with the energy efficiency of a conventional motor vehicles powered by a standard internal-combustion engines which presently demonstrate a comparable energy efficiency of approximately 14–28%.

Figure 3:
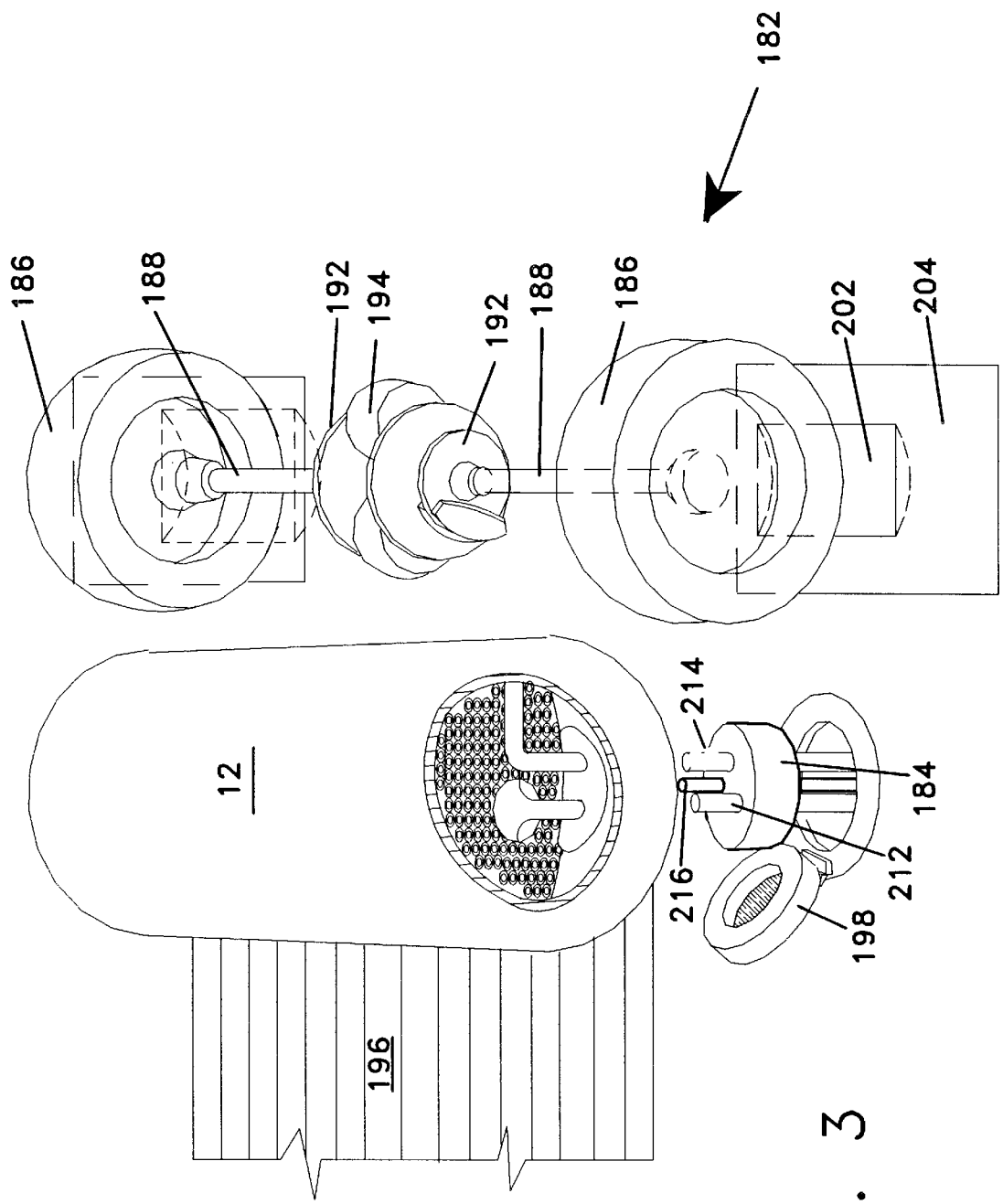
FIG. 3 is a cutaway perspective view of a portion of a motor vehicle positioned adjacent to the regeneration station of FIG. 2 which specifically illustrates a coupling for automatically uniting the regeneration station with the motor vehicle during regeneration of the thermal-energy-storage material.

FIG. 3 is a cutaway perspective view of a portion of a motor vehicle, referred to by the general reference character 182, positioned adjacent to the regeneration station 124. FIG. 3 specifically illustrates an automated coupling 184 which unites the regeneration station 124 with the motor vehicle 182 during regeneration of the TESM 16. The illustration of FIG. 3 depicts wheels 186, drive shafts 188, disc brakes 192, electric driving motor 194, a portion of a chassis 196 of the motor vehicle 182, and a partially cut-away view of the WFHV 12.

Before commencing regeneration of the TESM 16, the automated coupling 184 is located beneath ground level and blocked by a cover plate 198. One of the wheels 186 of the motor vehicle 182 is then positioned in a depressed trough 202 of a fixed vehicle positioning plate 204. Disposing the wheel 186 in the trough 202 fixes the location of the motor vehicle 182 with respect to the automated coupling 184. After the wheel 186 has been positioned in the trough 202, the cover plate 198 automatically opens and the automated coupling 184 rises out of the ground toward the WFHV 12 that is located directly above. The automated coupling 184 includes a hot gas source line 212, a hot gas return line 214, and a combustible-fuel line 216. The hot gas source line 212 and the hot gas return line 214 provide conduits by which the regenerating gas 126 flows through the WFHV 12 immediately after the automated coupling 184 extends sufficiently far above ground level to mate the lines 212, 214 and 216 with corresponding ports 222, 224 and 226 of the WFHV 12 illustrated in FIG. 4. After the regenerating gas 126 begins flowing through the WFHV 12, the regeneration station 124 then supplies the combustible fuel 142 to the WFHV 12 through the combustible-fuel line 216. After the TESM 16 has been regenerated, the flows of the regenerating gas 126 and the combustible fuel 142 are terminated, the automated coupling 184 retracts away from the motor vehicle 182 to return to a subterranean position, and the cover plate 198 returns to a position blocking the automated coupling 184.

By sensing and monitoring the temperature of the regenerating gas 126 returning to the regeneration station 124 from the WFHV 12, the regeneration station 124 may both monitor the regeneration state of the TESM 16, and measure the quantity of energy required to regenerate the TESM 16. By monitoring the quantity of energy required to regenerate the TESM 16, the regeneration station 124 can determine an appropriate price for the quantity of energy deposited into the TESM 16.

While the regeneration station 124 is preferred for efficiently and swiftly regenerating the thermal energy stored in the TESM 16 of the WFHV 12, slower thermal energy regeneration using hot gas may be obtained using a simpler system. In such a simpler system, the blower 136 supplies cool regenerating gas 126 directly to the regeneration gas inlet 146 of the FTRCV 66, and the combustible fuel 142 is supplied only to the combustible-fuel inlet port 172 of the WFHV 12. While such a simplified system, suitable for installation in a garage of a house, does not achieve the same energy efficiency as the regeneration station 124, it still achieves an overall efficiency of approximately 40 to 45%. This efficiency for regeneration of the thermal energy stored in the TESM 16 yields an overall motor vehicle efficiency of 35 to 40% in converting energy in the combustible fuel 142 into driving energy for the vehicle's wheels.

The overall efficiency of the APGU 10 for converting thermal energy into electrical energy may be further increased beyond that described above. An approach for improving the efficiency of the APGU 10 is to increase the number of compressor disks 36 from two (2) to four (4), correspondingly increasing the number of turbine wheels 78 from two (2) to four (4), and passing the working fluid 22 discharged from the first pair of compressor disks 36 through an intercooler before admitting the working fluid 22 into the second pair of compressor disks 36. Employing the preceding approach for enhancing the efficiency of the APGU 10 makes it feasible to attain an overall efficiency of 60% for the conversion of thermal energy stored in the TESM 16 into electrical energy discharged from the power output terminals 108.

While the preferred embodiment of the WFHV 12 has been described hereinabove, it is intended that the present invention encompasses the APGU 10 if adapted for use in conjunction with working-fluid heating vessels having alternative structures and/or employing other thermal-energy-storage materials. For example, the APGU 10 of the present invention may be adapted for use with a working-fluid heating vessel that contains a thermal-energy-storage material such as lithium hydride or lithium fluoride, or other materials such as those listed in col. 5 at lines 43–54 of U.S. Pat. No. 4,207,268 which is hereby expressly incorporated herein by reference. Similarly, in principle a heat battery similar to the type disclosed in U.S. Pat. No. 4,258,667, which is also hereby expressly incorporated herein by reference, could be used with the APGU 10.

While gaseous regeneration of the TESM 16 has been described herein as using a combustible-fuel to heat air that is forced through the WFHV 12, the present invention envisions using a gas of any composition that is heated in any way to a temperature that is sufficiently hot for restoring thermal energy to the TESM 16.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A non-polluting, open-Brayton-cycle automotive power-generation-unit comprising:

a power-generation-unit drive shaft secured within said automotive power-generation-unit to be rotatable about a longitudinal axis of said power-generation-unit drive shaft;

a power-generation-unit compressor having a impeller that is secured to said power-generation-unit drive shaft so as to be rotatable together with said power-generation-unit drive shaft about the longitudinal axis of said power-generation-unit drive shaft, said power-generation-unit compressor having a compressor inlet for admitting a flow of working fluid into said automotive power-generation-unit from atmosphere surrounding said automotive power-generation-unit, said power-generation-unit compressor also having a working-fluid compressor outlet for discharging the flow of working fluid from the power-generation-unit compressor, rotation of the power-generation-unit drive shaft together with the impeller secured thereto drawing the flow of working fluid into said power-generation-unit compressor through the compressor inlet and discharging the flow of working fluid from the working-fluid compressor outlet, during normal operation of the automotive power-generation-unit said power-generation-unit compressor exhibiting a pressure ratio less than three;

a power-generation-unit turbine having a turbine wheel that is secured to said power-generation-unit drive shaft so as to be rotatable together with said power-generation-unit drive shaft about the longitudinal axis of said power-generation-unit drive shaft, said power-generation-unit turbine having a turbine inlet that is adapted to be coupled to a heating-vessel working-fluid outlet of a working-fluid heating-vessel and through which said power-generation-unit turbine receives a flow of hot gaseous working fluid from the heating-vessel working-fluid outlet after such working fluid has been heated while passing through said working-fluid heating-vessel, and said power-generation-unit turbine also having a turbine exhaust through which the flow of working fluid discharges from said power-generation-unit turbine, the flow of working fluid passing through said power-generation-unit turbine inducing rotation both of said turbine wheel and of said power-generation-unit drive shaft of said automotive power-generation-unit; and a working-fluid heat regenerator having a turbine-exhaust inlet that is coupled to the turbine exhaust of said power-generation-unit turbine for receiving the flow of the working fluid exhausted from said power-generation-unit turbine which said working-fluid heat regenerator discharges into the atmosphere surrounding said automotive power-generation-unit from a heat-regenerator outlet, said working-fluid heat regenerator also including a heat-regenerator compressor working-fluid inlet that is coupled to the working-fluid compressor outlet of said power-generation-unit compressor for receiving the flow of working fluid from said power-generation-unit compressor which said working-fluid heat regenerator discharges from a heat-regenerator working-fluid heating-vessel outlet into a heating-vessel working-fluid inlet of the working-fluid heating-vessel, a flow of thermal energy within said working-fluid heat regenerator cooling the flow of working fluid passing through the working-fluid heat regenerator from the power-generation-unit turbine while concurrently heating the flow of working fluid passing through the working-fluid heat regenerator from the power-generation-unit compressor.

2. The automotive power-generation-unit of claim 1 further comprising an alternator having a fixed stator and a moveable rotor which is coupled to the power-generation-unit drive shaft of said automotive power-generation-unit so as to be rotatable by said power-generation-unit drive shaft, said alternator also having a pair of alternator power-output terminals for supplying an electric current to an external electrical load, rotation of said rotor by said power-generation-unit drive shaft causing said alternator to generate an electrical potential across the pair of alternator power-output terminals.

3. The automotive power-generation-unit of claim 2 wherein the alternator is an axial-gap alternator.

4. The automotive power-generation-unit of claim 1 further comprising the working-fluid heating-vessel.

5. The automotive power-generation-unit of claim 4 wherein the thermal-energy-storage material is a ceramic material.

6. The automotive power-generation-unit of claim 5 wherein the ceramic material includes a plurality of sealed ceramic tubes filled with a phase-change material that melts at a temperature within an operating temperature range of the thermal-energy-storage material.

7. The automotive power-generation-unit of claim 6 wherein the ceramic tubes are fabricated from beryllium oxide, and the phase-change material is silicon.

8. The automotive power-generation-unit of claim 4 wherein the working-fluid heating-vessel further comprises a thermal-energy-regeneration means adapted for increasing the thermal energy stored in the thermal-energy-storage material.

9. The automotive power-generation-unit of claim 8 wherein the thermal-energy-regeneration means includes a hot fluid exchange port into said working-fluid heating-vessel through which a hot-fluid may be introduced into and circulated throughout the thermal-energy-storage material contained within said working-fluid heating-vessel.

10. The automotive power-generation-unit of claim 9 wherein said thermal-energy-regeneration means of the working-fluid heating-vessel further includes:

a combustible-fuel inlet port adapted to receive and introduce into the working-fluid heating-vessel a combustible fuel; and a burner adapted to receive combustible fuel introduced into the working-fluid heating-vessel, and to burn the combustible fuel within the working-fluid heating-vessel thereby generating heat within the working-fluid heating-vessel.

11. The automotive power-generation-unit of claim 8 wherein the thermal-energy-regeneration means includes:

an air inlet through which a atmosphere surrounding said automotive power-generation-unit may be introduced into and circulated throughout the thermal-energy-storage material contained within said working-fluid heating-vessel;

a combustible-fuel inlet port adapted to receive and introduce into the working-fluid heating-vessel a combustible fuel; and a burner adapted to receive combustible fuel introduced into the working-fluid heating-vessel, and to burn the combustible fuel within the working-fluid heating-vessel thereby generating heat within the working-fluid heating-vessel.

12. The automotive power-generation-unit of claim 8 wherein the thermal-energy-regeneration means includes an electric heater.

13. The automotive power-generation-unit of claim 4 wherein the working-fluid heating-vessel further comprises a bypass valve coupled between the heat-regenerator working-fluid heating-vessel outlet of said working-fluid heat regenerator and the turbine inlet of said power-generation-unit turbine that is adapted for diverting around the working-fluid heating-vessel the working fluid which flows from said working-fluid heat regenerator to said power-generation-unit turbine.

14. The automotive power-generation-unit of claim 13 wherein the thermal-energy-storage material is a ceramic material.

15. The automotive power-generation-unit of claim 14 wherein the ceramic material includes a plurality of sealed ceramic tubes filled with a phase-change material that melts at a temperature within an operating temperature range of the thermal-energy-storage material.

16. The automotive power-generation-unit of claim 15 wherein the ceramic tubes are fabricated from beryllium oxide, and the phase-change material is silicon.

17. The automotive power-generation-unit of claim 13 wherein the working-fluid heating-vessel further comprises a thermal-energy-regeneration means adapted for increasing the thermal energy stored in the thermal-energy-storage material.

18. The automotive power-generation-unit of claim 17 wherein the thermal-energy-regeneration means includes a hot fluid exchange port into said working-fluid heating-vessel through which a hot-fluid may be introduced into and circulated throughout the thermal-energy-storage material contained within said working-fluid heating-vessel.

19. The automotive power-generation-unit of claim 18 wherein said thermal-energy-regeneration means of the working-fluid heating-vessel further includes:

a combustible-fuel inlet port adapted to receive and introduce into the working-fluid heating-vessel a combustible fuel; and a burner adapted to receive combustible fuel introduced into the working-fluid heating-vessel, and to burn the combustible fuel within the working-fluid heating-vessel thereby generating heat within the working-fluid heating-vessel.

20. The automotive power-generation-unit of claim 17 wherein the thermal-energy-regeneration means includes:

an air inlet through which a atmosphere surrounding said automotive power-generation-unit may be introduced into and circulated throughout the thermal-energy-storage material contained within said working-fluid heating-vessel;

a combustible-fuel inlet port adapted to receive and introduce into the working-fluid heating-vessel a combustible fuel; and a burner adapted to receive combustible fuel introduced into the working-fluid heating-vessel, and to burn the combustible fuel within the working-fluid heating-vessel thereby generating heat within the working-fluid heating-vessel.

21. The automotive power-generation-unit of claim 17 wherein the thermal-energy-regeneration means includes an electric heater.

* * * * *